No. 865,655. PATENTED SEPT. 10, 1907.
G. T. PATTEN.
COMBINED CORN HARVESTER AND SHOCKER.
APPLICATION FILED FEB. 5, 1904.
4 SHEETS—SHEET 1.
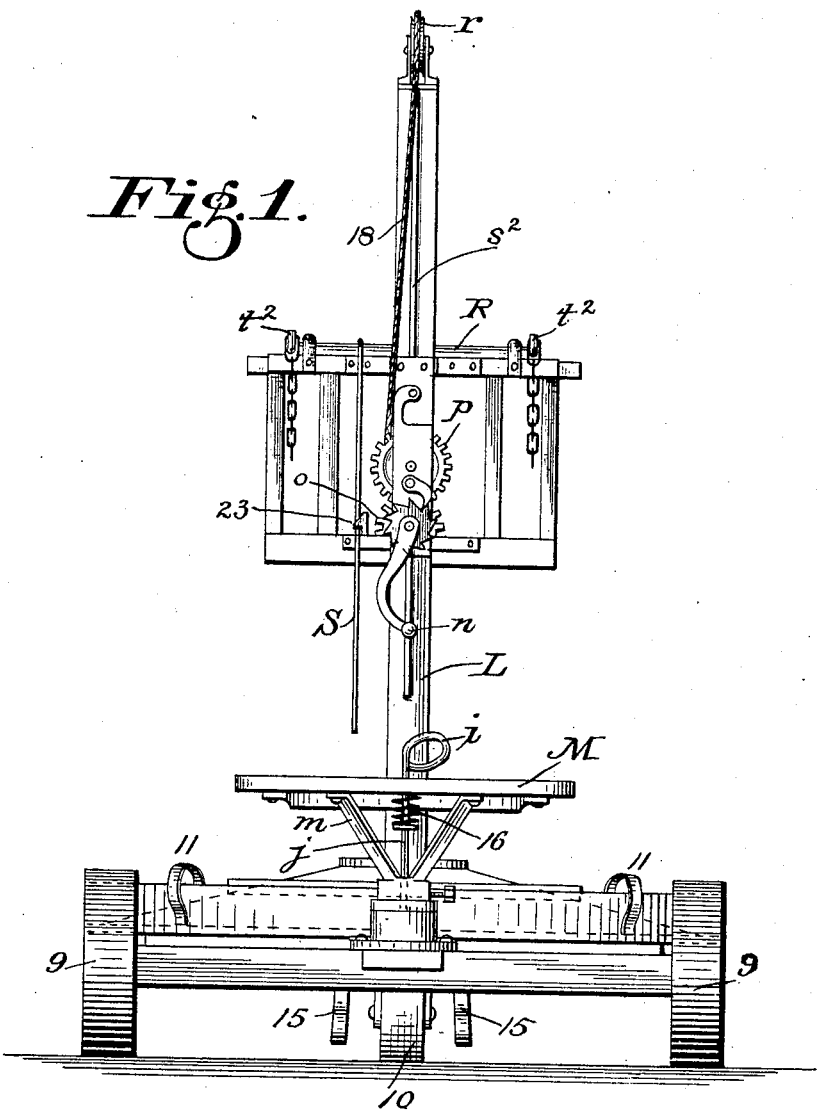
WITNESSES:
Luther A. Miller
Mayme R. McClelland
INVENTOR:
Grant T. Patten,
BY
Frank M. Burnham
Attorney.

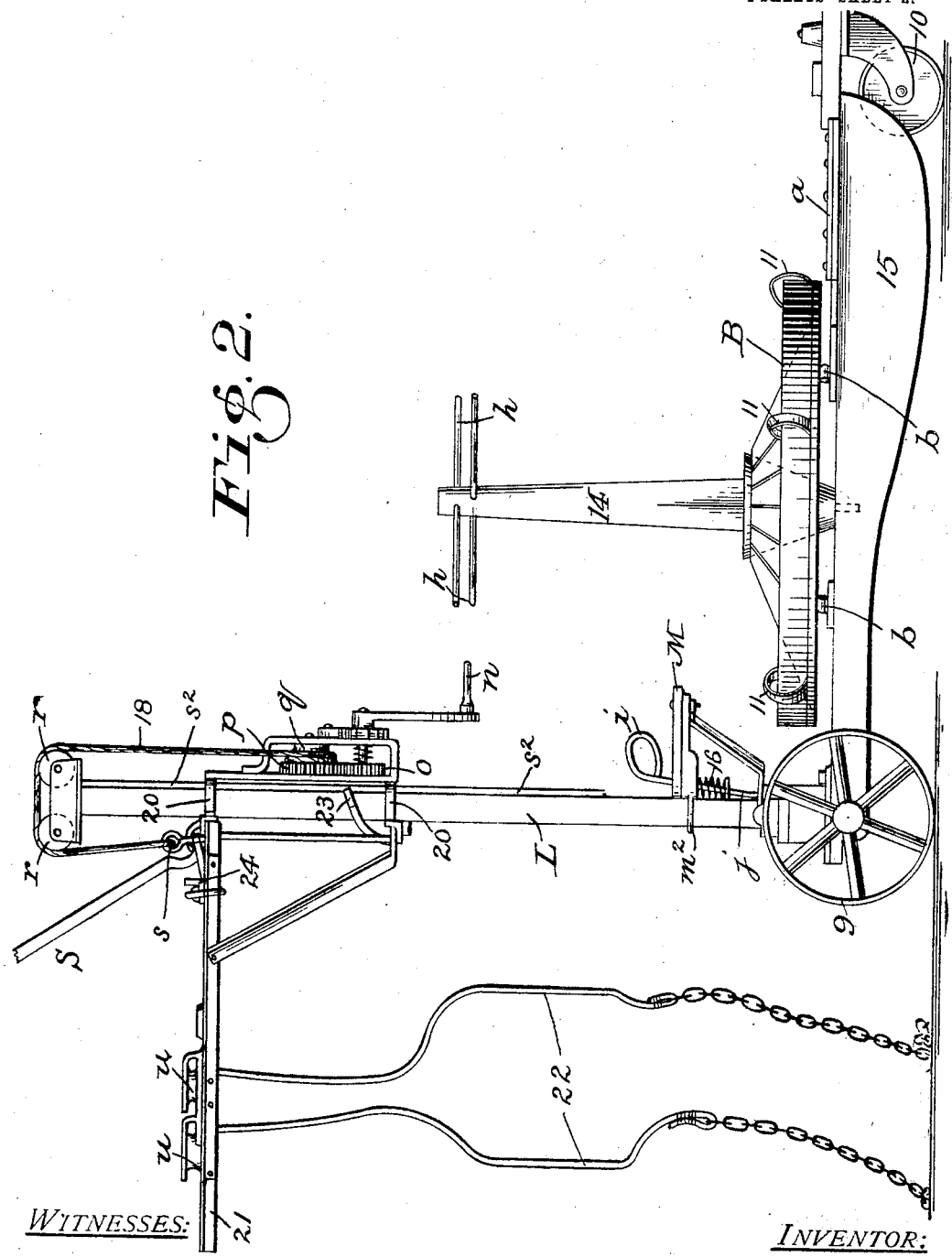

No. 865,655. PATENTED SEPT. 10, 1907.
G. T. PATTEN.
COMBINED CORN HARVESTER AND SHOCKER.
APPLICATION FILED FEB. 5, 1904.
4 SHEETS—SHEET 3.
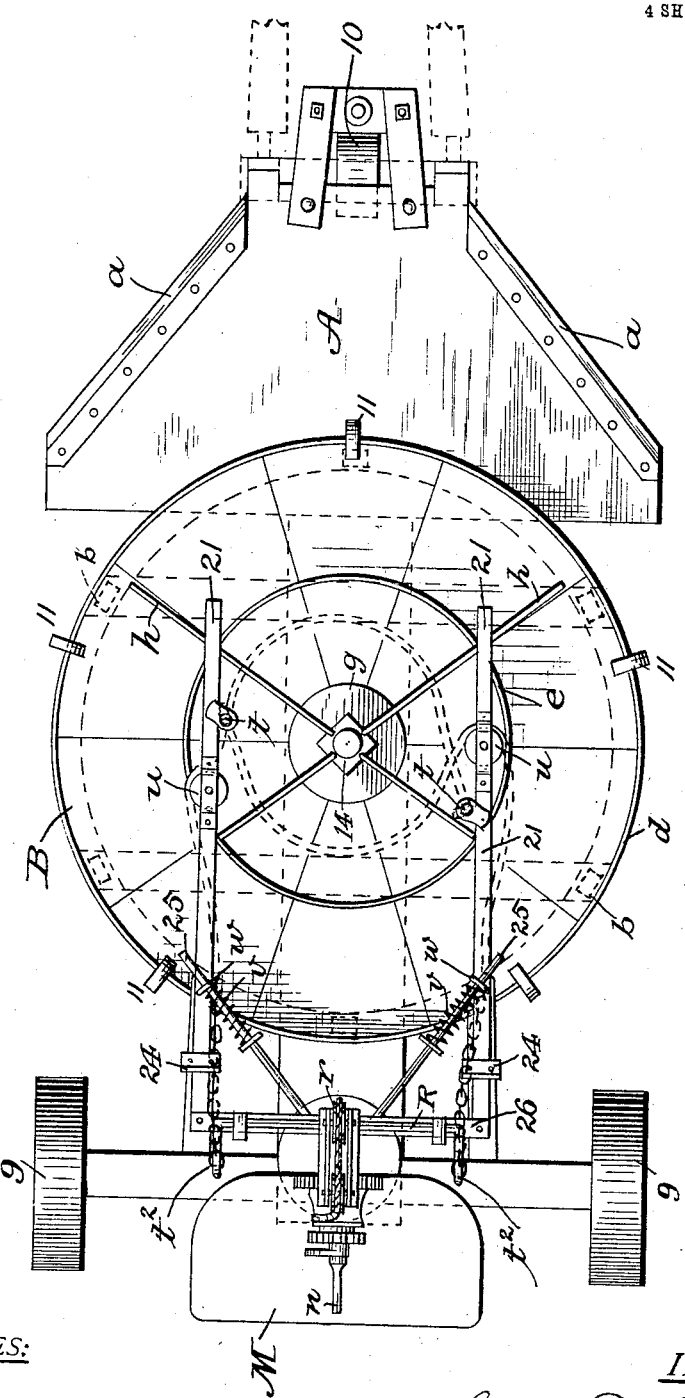
WITNESSES:
Luther A. Miller
Mayme H. McClelland
INVENTOR:
Grant T. Patten,
BY
Frank M. Burnham
Attorney.

No. 865,655. PATENTED SEPT. 10, 1907.
G. T. PATTEN.
COMBINED CORN HARVESTER AND SHOCKER.
APPLICATION FILED FEB. 5, 1904.
4 SHEETS—SHEET 4.
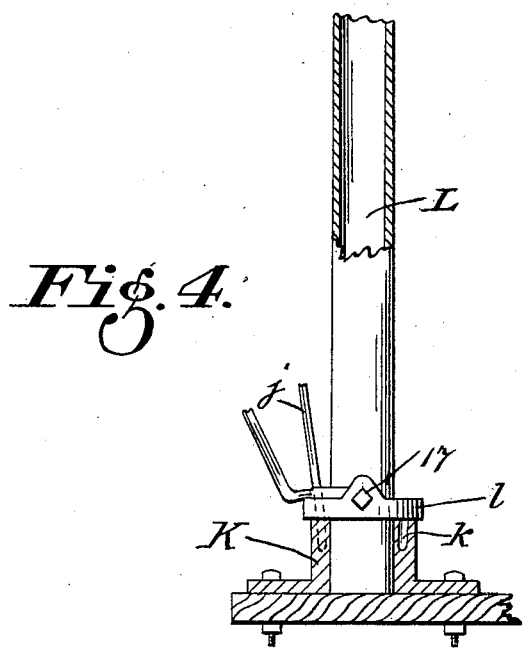
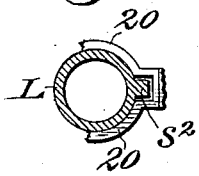
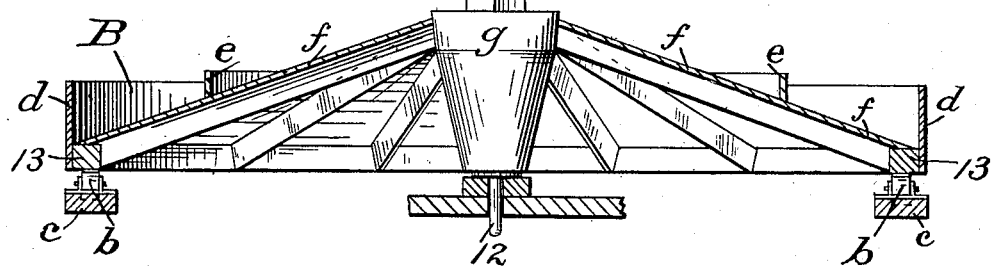
WITNESSES: INVENTOR:
Luther A. Miller Grant T. Patten,
Mayme R. McClelland. BY
Frank M. Burnham
Attorney.

UNITED STATES PATENT OFFICE.

GRANT T. PATTEN, OF NEWBERRY TOWNSHIP, MIAMI COUNTY, OHIO.

COMBINED CORN HARVESTER AND SHOCKER.

No. 865,655.        Specification of Letters Patent.        Patented Sept. 10, 1907.

Application filed February 5, 1904. Serial No. 192,194.

*To all whom it may concern:*

Be it known that I, GRANT T. PATTEN, a citizen of the United States, residing at Newberry township, in the county of Miami and State of Ohio, have invented certain new and useful Improvements in a Combined Corn Harvester and Shocker; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My present invention relates to improvements in that class of agricultural machines commonly known as a combined corn harvester and shocker; and to one that will in every way give more perfect results, and more effectively accomplish the purposes for which it is intended, than other devices intended for a like purpose now in general use.

The main objects of this my invention, consists in producing a machine that will facilitate the laborious and tedious method of harvesting and shocking corn, when done entirely by hand; as in the old manner; also in allowing of the utilization of land space in shocking; and the saving of time in gathering.

Among some of the principal advantages of my invention as accruing from, and the results of the above objects, may be mentioned the following, to wit:— The machine may be operated by two men; is easily and readily operated; is simple in construction being composed of few parts; can be quickly and easily repaired, and is inexpensive in cost of manufacture.

This invention, referring in general terms to the construction of the machine, consists of the transporting frame of the harvester, supported by two rear wheels and one forward swivel-wheel; the knives for cutting the corn; the revolving platform having the central standard or upright provided with the cross-arms, against and between which the stalks are placed while being formed into a shock; and the swinging-crane and attachments, and the standard for supporting the same, by which the shock when formed is raised from the revolving-platform and dropped or set in the field; and the peculiar and novel combination and arrangement of these parts as will be more fully described hereinafter and pointed out in the subjoined claims in accordance with the statutes in such cases made and provided therefor.

In the annexed drawings forming a part of this specification, and wherein the same letters and numerals have reference to like parts wherever occurring throughout the several views:—Figure 1, is a rear or end elevation of my improved corn harvester and shocker, with the swinging crane lowered to the position it rests in when suspended over the revolving platform ready to connect with the shock: and Fig. 2, is a side elevation of said device, with the swinging crane raised and in an opposite position as seen in Fig. 1, just after having dropped the shock in the field. Fig. 3, is a plan view of said device with the parts in the same position shown in Fig. 1. Fig. 4, is a detail view showing manner of supporting standard of swinging crane. Fig. 5, is a vertical sectional view in detail of the revolving platform; and Fig. 6 is a detail view, showing more clearly one of the collars which support the swinging crane from the standard.

In describing my invention and referring in detail to the different mechanical parts which combine together to form my corn harvester and shocker, as shown throughout the several views of the annexed drawings, and indicated by means of the letters and numerals of reference as aforesaid; A indicates the forward or front platform, which is sufficiently wide and inclined so that knives *a*,—which are set at an angle,—see Fig. 3,—and firmly but detachably connected thereto in any ordinary and well known manner:—will each readily cut the corn stalks in the row on both sides of the machine simultaneously, as said machine; which is supported by rear wheels 9 and forward swivel wheel 10, in an ordinary manner, (and is preferably intended to be drawn by two horses tandem style;) moves forward between the two rows of corn, the stalks from each row as cut being gathered by the two attendants who are stationed one on each side of said platform near each of the knives, said stalks being placed or deposited in an upright position with the butts downward, and resting within revolving-platform B; said revolving platform being provided with hand-holds 11 which the operators grasp and thus turn or revolve said platform by reasons of its pivotal bearing 12 and anti-frictional rollers *b* suitably supported in cross bars *c*, and the supporting frame of the machine; which latter may be of any suitable form desired—see dotted lines in Fig. 3, also in Fig. 5.

Revolving platform B which is circular in form, is formed at its base with a rib or rail 13, which permits of it being turned or revolved over anti-frictional rollers *b*,—as just referred to;—and is provided with an outer flange *d* for holding or retaining the bottom or butts of the stalks in position, also an inner flange *e*—which also assists in retaining the stalks in position while being shocked,—said inner flange being a slight rise from floor *f* which is inclined slightly upward to where it connects with hub *g*,—approximately in the form of an apex,— thus causing the shock when completed to be concaved at its base or bottom, so that when dropped in the field in rear of machine it will readily stand and not topple over, thus avoid what has heretofore been a great objection in shocking—From the center of said revolving platform, and rising from hub *g*, is the post 14, around which the shock is formed; and at the top of said post and resting loosely and removably in openings adapted to receive them, are the two rods *h* which when placed in position leave or form four divisions or compartments as fully shown in Fig. 3,—in which the stalks constituting one or more hills, are allowed to rest when placed or set in said revolving platform, as heretofore described; and are thus secured in an upright position by reason of said rods against which they rest, while said shock is being formed. As shown in Fig. 5, floor *f* of the revolving platform is supported by radial braces extending from rail 13 to hub *g*.

Extending longitudinally one on each side of the center of the machine, from the axle of the rear wheels to near the swivel-wheel at front of machine, are two guide-boards 15, in form of runners, for the purpose of preventing the machine from being depressed or tilted too much to one side at the front or forward end:—see Fig. 2.

After a shock has been formed or made up on revolving platform B, by revolving the same so as to receive the stalks, as hereinbefore described; the operator by means of handle *i* of rod *j*, raises said rod out of its bearing *k*, see Fig. 4, in socket K; said socket being firmly connected to rear axle and collar *l*; and by reason of the compression of spring 16 which holds said rod in its bearing *k* when in its normal position, will permit of said collar which is rigidly bolted on each side at 17 to standard L, to turn, and with it said standard:—which is preferably hollow and constructed out of thin strong metal so as to be as light as possible;— when small platform M which is supported by brace *m* extending from collar *l*, and suitably connected at $m^2$ to standard L will also turn, as well as the attachments carried at top of the standard, which will be described hereinafter; and will swing from the position shown in Fig. 2 until they assume the position shown in Figs. 1 and 3; when the operator by standing upon platform M and turning crank handle *n*;— (said crank being provided with an ordinary form of pawl and ratchet for holding and controlling the movement in the usual manner) will cause the teeth of pinion *o*, to mesh with teeth of pinion *p* and revolve the same together with its small drum or pulley *q*, thereby permitting of rope 18 unwinding from said drum or pulley and passing over the two anti-friction pulleys *r*; and as said rope is connected to metallic frame at S of the swinging crane, said frame by reason of the loops or collars 20, (which are each provided with a notch or recess, and encircle standard L in an ordinary manner, and therefore not necessary to be here shown in detail;) and which through the medium of the notch or recess engages the feather or spline $S^2$ formed on standard L, will move or drop down said standard until longitudinal arms 21 rest in a position over the revolving platform, one on each side of the shock,— see Fig. 3,—when the cables 22,—which are suitably connected to arms 21 at *t* are passed around the shock in the position shown in dotted lines in Fig. 3; when rods *h* are removed, and by passing the links of the chain forming the free end of the cable over hooks $t^2$ of shaft R and holding said shaft in position by reason of its lever S being thrown down and brought into engagement with catch 23.

The longitudinal arms 21 are provided with small pulleys *u* around which cables 22 move or play: said arms being further provided with rests or supports 24 on which the cables rest, said arms 21 are reinforced as to their support, and allow of any slight lateral movement, by rods 25 extending from the cross-bar 26 of said arms, which are provided with springs *v* and stops for said spring; the end of said rods passing through and resting in eyes *w* mounted upon arms 21:— see Fig. 3.

After cables 22 have been made sufficiently tight or taut around the shock to support it when raised, as shown more particularly in Fig. 3,—and as heretofore described;—one of the attendants again mounts small platform M and by operating crank-handle *n*, (as hereinbefore described) rope 18 as it is wound over small drum or pulley *q*, will cause the swinging crane and its attachments including longitudinal arms 21, to rise and with them the shock, and by raising handle *i*, rod *j* will be released from its bearing and the standard L—as heretofore referred to and fully described; can be swung with the shock to the position shown in Fig. 2, when lever S being released from catch 23, shaft R will turn in its bearings, and hooks $t^2$ will also turn, thus releasing the links of chain at end of cable 22 through the medium of rests 24,—which now act as trips by raising said links out of engagement with the hooks $t^2$,—and as the cables 22 are thus disengaged from the shock, said shock will be dropped in the field directly in the rear and center of the machine, and rest firmly in an upright position on its concaved base or bottom, as hereinbefore fully described.

I wish it to be here understood, that should I so desire, as availing myself of the privilege,—according to the well known and long established doctrine of patent law,—of making any slight and minor changes or alteration in the location, form or construction of the parts, all within the scope and spirit of the invention, so long as not departing from the principles thereof; as may from time to time suggest itself and be deemed necessary.

Having now described my combined corn harvester and shocker what I claim is:—

1. An apparatus for harvesting and shocking corn, comprising the following combination of elements; to wit:— the transporting frame mounted upon suitable wheels for moving the same; the cutters or knives for severing the stalks in two rows; the revoluble platform inclined from the center downwardly and outwardly, said platform provided with a post having rods extending therefrom for supporting the severed stalks in position on the platform while they are being formed into the shock; the standard having the stationary platform, and provided with means for holding it stationary or permitting of its being turned; the swinging crane adapted to move up and down upon said standard and provided with the arms and cables; the pinions, drum and rope for raising and lowering said swinging crane; all substantially as described.

2. The combination in a corn harvesting and shocking machine, of the transporting frame; the cutters inclined rearward and outward for simultaneously severing the stalks from more than one row, the revoluble platform having a floor approximately conical in shape and provided with a post having means for supporting the stalks after being severed and while they are being formed into a shock with a concaved base; the standard carrying the swinging crane and its attachments for lifting and handling the shock; and means for raising and lowering said swinging-crane and attachments; all substantially as described.

3. A platform for forming or shaping a corn shock or other body with a concaved base or bottom; said platform having an outer flange, a slight rise or inner flange, an inclined floor approximately in form of a cone, and a post or upright provided at its top with detachable rods; substantially as and for the purpose described.

4. In a combined corn harvester and shocker, the combination of the transporting frame having rear wheels and a forward or swivel wheel; the rearwardly and outwardly inclined knives or cutters for severing the stalks for two rows; the revoluble platform the floor of which is slightly for two rows; the revoluble platform of which is slightly conical in shape and having an outer flange, and provided with a post or upright having removable rods for supporting the severed stalks in position on the platform while they are being formed into a shock; the standard and swinging crane provided with the arms and cables; the pinions, rope and anti-friction pulleys for raising and lowering said crane and its arms; the socket portion in which said standard rests, and its hand rod; all substantially as and for the purpose described.

In testimony whereof, I have affixed my signature, in presence of two witnesses.

GRANT T. PATTEN.

Witnesses:
JAS. O. HARTSHORN,
FRANK H. KRONAUGE.